United States Patent
Mitani et al.

(10) Patent No.: US 10,263,290 B2
(45) Date of Patent: Apr. 16, 2019

(54) NONAQUEOUS ELECTROLYTE SECONDARY BATTERY

(71) Applicant: SANYO Electric Co., Ltd., Daito-shi, Osaka (JP)

(72) Inventors: Shunsuke Mitani, Hyogo (JP); Satoshi Yamamoto, Osaka (JP); Yasunori Watanabe, Tokushima (JP); Kentaro Takahashi, Hyogo (JP); Masaki Deguchi, Hyogo (JP); Yuta Ichikawa, Tokushima (JP); Masaya Ugaji, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 260 days.

(21) Appl. No.: 15/327,175

(22) PCT Filed: Jul. 14, 2015

(86) PCT No.: PCT/JP2015/003551
§ 371 (c)(1),
(2) Date: Jan. 18, 2017

(87) PCT Pub. No.: WO2016/013179
PCT Pub. Date: Jan. 28, 2016

(65) Prior Publication Data
US 2017/0170525 A1 Jun. 15, 2017

(30) Foreign Application Priority Data
Jul. 23, 2014 (JP) .................. 2014-149641

(51) Int. Cl.
*H01M 10/0587* (2010.01)
*H01M 2/14* (2006.01)
(Continued)

(52) U.S. Cl.
CPC ......... *H01M 10/0587* (2013.01); *H01M 2/14* (2013.01); *H01M 2/16* (2013.01);
(Continued)

(58) Field of Classification Search
None
See application file for complete search history.

(56) References Cited

U.S. PATENT DOCUMENTS 5,925,482 A * 7/1999 Yamashita ............ H01M 6/103
429/130
6,258,478 B1 7/2001 Kim
(Continued)

FOREIGN PATENT DOCUMENTS

JP 11-214027 A 8/1999
JP 2000-21452 A 1/2000
(Continued)

OTHER PUBLICATIONS

International Search Report dated Oct. 13, 2015, issued in counterpart of International Application No. PCT/JP2015/003551 (2 pages).

*Primary Examiner* — Rena Dye Cronin
(74) *Attorney, Agent, or Firm* — Westerman, Hattori, Daniels & Adrian, LLP

(57) ABSTRACT

It is an object of the present invention to provide a nonaqueous electrolyte secondary battery in which swelling due to charge-discharge cycling is inhibited. The nonaqueous electrolyte secondary battery including a flat electrode assembly in which a first electrode plate and a second electrode plate having a different polarity from the first electrode plate are wound with a separator provided therebetween.

7 Claims, 1 Drawing Sheet

(51) Int. Cl.
  *H01M 4/587* (2010.01)
  *H01M 4/48* (2010.01)
  *H01M 2/16* (2006.01)
  *H01M 2/26* (2006.01)
(52) U.S. Cl.
  CPC ............ *H01M 2/26* (2013.01); *H01M 2/263* (2013.01); *H01M 4/483* (2013.01); *H01M 4/587* (2013.01)

(56) References Cited

U.S. PATENT DOCUMENTS

| | | | |
|---|---|---|---|
| 6,329,097 | B1 | 12/2001 | Kim |
| 6,682,853 | B2 * | 1/2004 | Kimijima .......... H01M 10/0525 29/623.3 |
| RE43,241 | E | 3/2012 | Kim |
| 2006/0216609 | A1 * | 9/2006 | Abe ....................... H01M 4/13 429/246 |
| 2013/0244073 | A1 * | 9/2013 | Fujimoto .......... H01M 10/0431 429/94 |

FOREIGN PATENT DOCUMENTS

| | | | |
|---|---|---|---|
| JP | 2000-82484 | A | 3/2000 |
| JP | 2002-8709 | A | 1/2002 |
| JP | 2008-41581 | A | 2/2008 |
| JP | 2010-108679 | A | 5/2010 |
| JP | 2012-49089 | A | 3/2012 |
| JP | 2014-7010 | A | 1/2014 |

* cited by examiner

CORNER PORTION

NONAQUEOUS ELECTROLYTE SECONDARY BATTERY

TECHNICAL FIELD

The present invention relates to a nonaqueous electrolyte secondary battery including a flat wound electrode assembly.

BACKGROUND ART

In recent years, thin electronic devices, such as smartphones and tablets, have been widely used. There is an increasing demand for a reduction in the thickness of nonaqueous electrolyte secondary batteries used as power supplies to drive them. Nonaqueous electrolyte secondary batteries in which electrode assemblies are arranged in prismatic cans or pouches, each of the electrode assemblies including a positive electrode plate, a negative electrode plate, and a separator, the positive electrode plate and the negative electrode plate being wound with the separator provided therebetween, have been widely used as thin batteries.

A typical nonaqueous electrolyte secondary battery is designed in such a manner that the capacity ratio of a negative electrode to a positive electrode is higher than 1. The capacity ratio is calculated on the basis of the capacity per unit area of each of the positive electrode and the negative electrode. Electrode plates and a separator of a flat wound electrode assembly each include two straight portions and two corner portions connecting the two straight portions in a section in a direction perpendicular to a winding axis of the electrode assembly. In the straight portions, the area of a positive electrode plate is equal to the area of a negative electrode plate facing the positive electrode plate with the separator provided therebetween, and thus, the capacity ratio is matched to its design value. In the corner portions, however, the electrode plate disposed on a more inner peripheral side of the electrode assembly has a smaller curvature radius, and thus, the area of a positive electrode plate is not equal to the area of a negative electrode plate facing the positive electrode plate with the separator provided therebetween. This causes a deviation of the capacity ratio in each of the corner portions from the design value. The amount of the deviation increases on the more inner peripheral side. In particular, in a portion where the positive electrode plate and the negative electrode plate face each other, the capacity ratio in a portion where the negative electrode plate is disposed on an inner peripheral side of the electrode assembly is lower than the design value, thus leading to a high state of charge of the negative electrode.

A flat wound electrode is produced by winding a predetermined amount of a separator on a winding core portion, then inserting a positive electrode plate and a negative electrode plate into the winding core portion, and winding them. As described above, the predetermined amount of the separator is disposed in the innermost peripheral portion of an electrode assembly. This prevents the winding of the negative electrode plate in an excessively small curvature radius in corner portions of the electrode assembly. However, in the case where an electrode assembly is pressed under heavy load or where the amount of the separator wound in a leading portion is reduced in order to further reduce the thickness of a battery, the curvature radius of the negative electrode plate is reduced in corner portions of the innermost peripheral portion, leading to a high state of charge of the negative electrode in the corner portions. This can cause the negative electrode plate to swell or deform to swell the battery.

Patent Literature 1 discloses a secondary battery in which a positive electrode active material is applied so as to have a small thickness and a negative electrode active material is applied so as to have a large thickness in corner portions of a flat wound electrode assembly in such a manner that the capacity ratio is not less than 1 even in the corner portions. However, it is difficult to change the thickness of part of an electrode plate and locate positions of the electrode plate corresponding to the corner portions of the electrode assembly prior to the production of the electrode plate. It is thus difficult to use the technique described in Patent Literature 1 as a mass production technique.

Patent Literature 2 discloses a secondary battery in which the thickness of a separator disposed on an outer peripheral side of a negative electrode plate is larger than the thickness of a separator disposed on an inner side of the negative electrode plate. The use of this structure prevents an internal short-circuit even if a region of an electrode assembly having a capacity ratio less than 1 is formed to precipitate lithium. However, although the thickness of the separator disposed on the outer peripheral side of the negative electrode plate is increased, the curvature radius of the negative electrode plate in corner portions is not changed. Instead, the curvature radius of a positive electrode plate disposed on the outer peripheral side of the separator having an increased thickness is increased to increase the area of the positive electrode plate facing the negative electrode plate, compared with the negative electrode plate disposed on the inner peripheral side. That is, the technique described in Patent Literature 2 further increases the deviation of the capacity ratio in the corner portions and thus is not inhibit the swelling of the battery due to the swelling or deformation of the negative electrode plate.

Patent Literature 3 discloses a secondary battery in which an insulating tape is bonded to the innermost peripheral side portion of portions where a positive electrode plate and a negative electrode plate face to each other in corner portions of an electrode assembly in order that the innermost peripheral side portion may not participate in charge-discharge reactions. When the insulating tape is bonded to the portion where the positive electrode plate and the negative electrode plate face to each other in the corner portion to prevent the occurrence of the charge-discharge reactions, the problem of an increase in the state of charge of a negative electrode is avoided. In the technique described in Patent Literature 3, however, the capacity reduction of a battery is inevitable, thereby failing to obtain a high-capacity battery.

CITATION LIST

Patent Literature

PTL 1: Japanese Published Unexamined Patent Application No. 11-214027
PTL 2: Japanese Published Unexamined Patent Application No. 2000-82484
PTL 3: Japanese Published Unexamined Patent Application No. 2008-41581

SUMMARY OF INVENTION

Technical Problem

The present invention has been accomplished in light of the foregoing circumstances and aims to provide a nonaqueous electrolyte secondary battery in which swelling due to the swelling or deformation of a negative electrode plate is inhibited by inhibiting an increase in the state of charge of a negative electrode in a corner portion of a flat wound electrode assembly.

Solution to Problem

To overcome the foregoing problems, a nonaqueous electrolyte secondary battery according to an embodiment of the present invention includes a flat electrode assembly in which a first electrode plate and a second electrode plate having a different polarity from the first electrode plate are wound with a separator provided therebetween, in which the first electrode plate is disposed on a more inner peripheral side of the electrode assembly than the second electrode plate, the first electrode plate includes a two-side-exposed core member portion where no active material layer is disposed on either side of a core member and a single-side-exposed core member portion where an active material layer is disposed on only an outer peripheral surface of a core member, the two-side-exposed core member portion and the single-side-exposed core member portion being provided in this order from a winding-start end portion of the first electrode plate, a collector tab is connected to the two-side-exposed core member portion, the single-side-exposed core member portion occupies at least one corner portion of two corner portions connecting two straight portions in an innermost periphery of the first electrode plate, and the active material layer disposed on the outer peripheral surface of the single-side-exposed core member portion in the at least one corner portion faces the active material layer disposed on an inner peripheral surface of the second electrode plate with the separator provided therebetween, and a spacer is disposed on at least part of an inner peripheral surface of the single-side-exposed core member portion in the at least one corner portion. The "innermost periphery of the first electrode plate" indicates a single turn starting from a winding-start end portion of the first electrode plate.

Although the spacer is preferably disposed in each of the corner portions, the effects of the present invention are provided as long as the spacer is disposed at least part of the corner portion. A range where the spacer is disposed beyond the corner portion may be freely determined. The spacer is preferably disposed so as not to overlap the collector tab in the thickness direction of the electrode assembly. This reduces the effect of the spacer on the thickness of the electrode assembly. The collector tab of the flat wound electrode assembly is usually connected to the straight portion of the electrode plate, and a predetermined space is provided between a connection portion of the collector tab and the corner portion. Thus, the space is easily disposed so as not to overlap the collector tab.

Advantageous Effects of Invention

According to the present invention, a nonaqueous electrolyte secondary battery that inhibits swelling due to the swelling or deformation of the negative electrode plate in the corner portion of the electrode assembly. The spacer is disposed at a position where the active material layer on the first electrode plate and the active material layer on the second electrode plate do not face each other, so that the spacer does not inhibit charge-discharge reactions.

DESCRIPTION OF EMBODIMENTS

Figure 1:
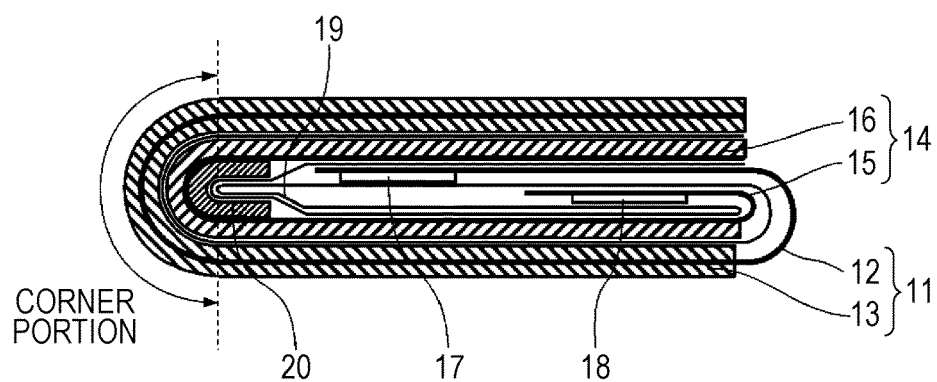
FIG. 1 is a cross-sectional view of an inner peripheral portion of an electrode assembly according to an example.

While embodiments of the present invention will be described below, the description is not intended to limit the present invention to the following embodiments.

Regarding a first electrode plate and a second electrode plate in the present invention, one is a positive electrode plate, and the other is a negative electrode plate. Each of the positive electrode plate and the negative electrode plate includes an active material layer on a core member. A collector tab is connected to a two-side-exposed core member portion of the innermost periphery of the first electrode plate. The collector tab is preferably connected to the inner peripheral surface of the two-side-exposed core member portion. A collector tab for the second electrode plate may be connected to at least one of the innermost periphery or outermost periphery of the second electrode plate. In the case where the collector tab for the second electrode plate is connected to the innermost periphery of the second electrode plate, the spacer is preferably disposed so as not to overlap the collector tab for the second electrode plate in the thickness direction of the electrode assembly.

Any spacer which functions to maintain a space and which does not adversely affect the battery may be used. Examples of the spacer include insulating plates and insulating tapes mainly containing polypropylene (PP), polyethylene terephthalate (PET), or polyimide (PI). As the insulating tapes, an insulating tape including an adhesive applied to a side of a base is preferably used. The use of the insulating tap enables the spacer to be fixed to the first electrode plate in advance, thus facilitating the production of the electrode assembly.

As a positive electrode active material, a lithium transition metal compound oxide capable of reversibly intercalating and deintercalating lithium ions may be used. Examples thereof include $LiMO_2$ (where M represents at least one of Co, Ni, and Mn), $LiMn_2O_4$, and $LiFePO_4$. These may be used separately or in combination as a mixture of two or more. In particular, $LiCoO_2$, $LiNiO_2$, and $LiCo_xNi_yMn_zO_2$ ($x+y+z=1$) are preferably used. Dissimilar elements, such as Al, Mg, Ti, and Zr, may be added to these lithium transition metal compound oxides.

As a negative electrode active material, a carbon material, for example, artificial graphite, natural graphite, non-graphitizable carbon, or graphitizable carbon, may be used. To increase the capacity of the negative electrode active material, silicon oxide represented by $SiO_x$ ($0.5 \leq x < 1.6$) may be mixed with the carbon material and used.

As a separator, a microporous membrane composed of polyolefin, for example, polyethylene (PE) or polypropylene (PP) may be used. A separator in which microporous membranes having different compositions are stacked may be used. In such a multilayer separator, preferably, a layer mainly composed of a low-melting-point polyethylene (PE) is used as an intermediate layer, and a surface layer composed of polypropylene (PP) having good oxidation resistance is used as a surface layer. Inorganic particles composed of, for example, aluminum oxide ($Al_2O_3$) titanium oxide ($TiO_2$), or silicon oxide ($SiO_2$), may be added to the separator. The inorganic particles may be supported in the separator or may be applied to a surface of the separator together with a binder.

As a nonaqueous electrolyte, a nonaqueous electrolyte in which a lithium salt serving as an electrolyte salt is dissolved in a nonaqueous solvent serving as a solvent may be used. A nonaqueous electrolyte including a gel-like polymer instead of the nonaqueous solvent may also be used.

As the nonaqueous solvent, cyclic carbonate, chain carbonate, cyclic carboxylate, or chain carboxylate may be used. These are preferably used in combination as a mixture of two or more. Examples of the cyclic carbonate include ethylene carbonate (EC), propylene carbonate (PC), and butylene carbonate (BC). A cyclic carbonate, such as fluoroethylene carbonate (FEC), in which hydrogen is partially replaced with fluorine may also be used. Examples of the chain carbonate include dimethyl carbonate (DMC), ethyl methyl carbonate (EMC), diethyl carbonate (DEC), and methyl propyl carbonate (MPC). Examples of the cyclic carboxylate include γ-butyrolactone (γ-BL) and γ-valerolactone (γ-VL). Examples of the chain carboxylate include methyl pivalate, ethyl pivalate, methyl isobutyrate, and methyl propionate.

Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Of these, $LiPF_6$ is particularly preferred. A concentration in the nonaqueous electrolyte is preferably in the range of 0.5 to 2.0 mol/L. A mixture of $LiPF_6$ and another lithium salt such as $LiBF_4$ may be used.

Embodiments of the present invention will be described in more detail on the basis of examples in which laminated outer shells are used.

Example 1

(Production of Positive Electrode Plate)

First, 95 parts by mass of lithium cobaltate ($LiCoO_2$) serving as a positive electrode active material, 2.5 parts by mass of carbon black serving as a conductive agent, and 2.5 parts by mass of polyvinylidene fluoride (PVdF) serving as a binder were mixed together. To this mixture, N-methylpyrrolidone (NMP) serving as a dispersion medium was added. The resulting mixture was sufficiently stirred to prepare a positive electrode mixture slurry. The positive electrode mixture slurry was applied to both surfaces of a positive electrode core member 12 formed of 12-μm-thick aluminum foil by a doctor blade method and dried to form a positive electrode active material layer 13. At this time, a two-side-exposed core member portion where no active material layer was disposed on either side of part of the positive electrode core member 12 was provided. The positive electrode active material layers 13 were pressed with rollers so as to have a packing density of 3.80 g/cc and cut into a predetermined size. Ultimately, a 200-μm-thick positive electrode collector tab 17 was connected to the two-side-exposed core member portion to produce a positive electrode plate 11.

(Production of Negative Electrode Plate)

First, 97 parts by mass of artificial graphite serving as a negative electrode active material, 2 parts by mass of styrene-butadiene rubber (SBR) serving as a binder, and 1 part by mass of carboxymethyl cellulose (CMC) serving as a thickener were mixed together. To this mixture, water serving as a dispersion medium was added. The resulting mixture was sufficiently stirred to prepare a negative electrode mixture slurry. The negative electrode mixture slurry was applied to both surfaces of a negative electrode core member 15 formed of 8-μm-thick copper foil by a doctor blade method and dried to form a negative electrode active material layer 16. At this time, a two-side-exposed core member portion where the negative electrode active material layer 16 was not disposed on neither side of part of the negative electrode core member 15 and a single-side-exposed core member portion where the negative electrode active material layer 16 is not disposed on only an outer peripheral surface of part of the negative electrode core member 15 were provided. The negative electrode active material layers 16 were pressed with rollers and cut into a predetermined size. Ultimately, a 200-μm-thick negative electrode collector tab 18 was connected to the two-side-exposed core member portion.

(Production of Electrode Assembly)

The positive electrode plate 11 and a negative electrode plate 14 were wound with a separator 19 provided therebetween, the separator 19 being formed of a 16-μm-thick microporous membrane composed of polyethylene, to produce a flat wound electrode assembly. As illustrated in FIG. 1, The negative electrode plate 14 is disposed on a more inner peripheral side of the electrode assembly than the positive electrode plate 11. That is, in Example 1, the negative electrode plate 14 corresponds to a first electrode plate of the present invention. Prior to the production of the electrode assembly, an insulating tape serving as a spacer 20 was bonded to a position corresponding to a corner portion of the innermost periphery of the negative electrode plate 14. The insulating tape had a base composed of polypropylene (PP). The bonded insulating tape had a width of 10 mm and a thickness of 50 μm.

(Preparation of Nonaqueous Electrolyte)

Ethylene carbonate (EC), propylene carbonate (PC), ethyl methyl carbonate (EMC), and methyl pivalate were mixed in a volume ratio of 25:5:10:60 to prepare a nonaqueous solvent used for a nonaqueous electrolyte. Lithium hexafluorophosphate ($LiPF_6$) serving as an electrolyte salt was dissolved in the nonaqueous solvent in such a manner that a 1 mol/L electrolyte salt solution was obtained, thereby preparing the nonaqueous electrolyte.

(Production of Battery)

The electrode assembly was inserted into a laminated outer shell which had been formed by cup forming. An outer circumferential portion of the laminated outer shell excluding an inlet was heat-sealed to produce a battery without a liquid injected. The nonaqueous electrolyte was injected, through the inlet, into the battery without a liquid injected. The inside of the battery was impregnated with the nonaqueous electrolyte in a vacuum state. Ultimately, the inlet was heat-sealed to produce a nonaqueous electrolyte secondary battery having a design capacity of 3600 mAh.

Example 2

A nonaqueous electrolyte secondary battery according to Example 2 was produced as in Example 1, except that an insulating tape including a base composed of polyethylene terephthalate (PET) was used in place of the insulating tape including the base composed of polypropylene (PP).

Example 3

A nonaqueous electrolyte secondary battery according to Example 3 was produced as in Example 1, except that an insulating tape including a base composed of polyimide (PI) was used in place of the insulating tape including the base composed of polypropylene (PP).

Example 4

A nonaqueous electrolyte secondary battery according to Example 4 was produced as in Example 1, except that the insulating tape had a thickness of 100 µm.

Example 5

A nonaqueous electrolyte secondary battery according to Example 5 was produced as in Example 1, except that the insulating tape had a thickness of 150 µm.

Example 6

A nonaqueous electrolyte secondary battery according to Example 6 was produced as in Example 1, except that a mixture of graphite and silicon oxide (SiO) was used as the negative electrode active material in place of graphite. The mixture had a silicon oxide content of 5% by mass.

Comparative Example 1

Figure 2:
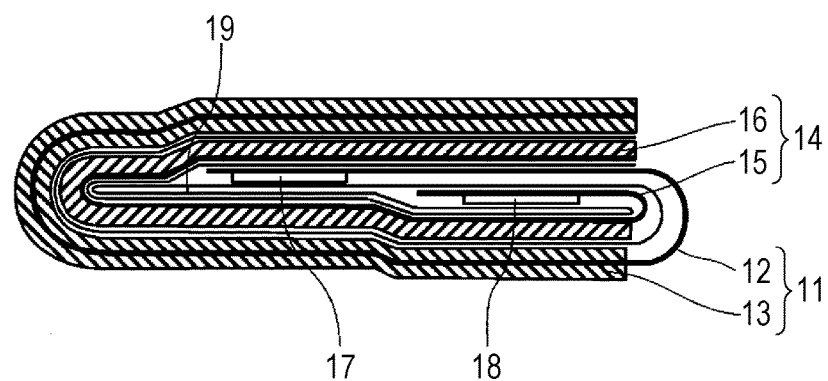
FIG. 2 is a cross-sectional view of an inner peripheral portion of an electrode assembly according to a comparative example.

A nonaqueous electrolyte secondary battery according to Comparative example 1 was produced as in Example 1, except that the spacer 20 was not used as illustrated in FIG. 2.

Comparative Example 2

A nonaqueous electrolyte secondary battery according to Comparative example 2 was produced as in Example 6, except that the spacer 20 was not used as illustrated in FIG. 2.

(Measurement of Thickness of Battery)

The batteries of Examples 1 to 3 and Comparative example 1 were subjected to initial charge and discharge. Then the thickness of each of the batteries was measured after the initial charge and discharge. The thickness of each battery after the initial charge and discharge was defined as the initial thickness of the battery. Subsequently, the batteries after the initial charge and discharge were subjected to charge-discharge cycling. Then the thickness of each of the batteries after the charge-discharge cycling was measured. The initial charge and discharge were performed under conditions described below. Charge was performed at a constant current of 0.5 It (=1800 mA) until the voltage reached 4.2 V. Subsequently, charge was performed at a constant voltage of 4.2 V until the current reached 1/20 It (=180 mA). After the charge, discharge was performed at a constant current of 0.5 It (=1800 mA) until the voltage reached 2.75 V. The charge-discharge cycling was repeated 300 cycles under conditions where the current value (0.5 It) in the constant-current charge and the constant-current discharge in the initial charge and discharge was changed to 1 It. The rate of increase in the thickness of the battery due to the charge-discharge cycling was calculated by the following formula:

Rate of increase in thickness of battery (%)=((thickness of battery after charge-discharge cycling)−(initial thickness of battery))/(initial thickness of battery)×100

Table 1 summarizes the initial thickness of the batteries of Examples 1 to 3 and Comparative example 1 and the rates of increase in the thickness of the batteries due to the charge-discharge cycling.

TABLE 1

| | Insulating tape | | Charge voltage (V) | Initial thickness of battery (mm) | Rate of increase in thickness of battery (%) |
|---|---|---|---|---|---|
| | Base | Thickness | | | |
| Example 1 | PP | 50 µm | 4.2 | 4.353 | 3.6 |
| Example 2 | PET | 50 µm | 4.2 | 4.357 | 3.5 |
| Example 3 | PI | 50 µm | 4.2 | 4.355 | 3.5 |
| Comparative example 1 | no | | 4.2 | 4.358 | 9.6 |

PP: polypropylene
PET: polyethylene terephthalate
PI: polyimide

Table 1 indicates that the rate of increase in the thickness of the battery of Example 1 is significantly lower than that of Comparative example 1. The results indicate that the use of the spacer prevented an excessively lower capacity ratio at the corner portion than the design value thereof from being obtained to inhibit the swelling of the batteries due to the swelling or deformation of the negative electrode plates at the corner portion. Similar results were obtained in Examples 2 and 3 in which the insulating tapes included different bases. The results indicate that the effects of the present invention do not depend on the material of the spacer.

The values of the initial thickness of the batteries of Examples 1 to 3 are equivalent to that of Comparative example 1. In each of Examples 1 to 3, the insulating tape serving as a spacer is bonded in the vicinity of the corner portion of the innermost periphery of the negative electrode plate. The spacer negligibly affects the initial thickness of the battery. The reason for this is presumably that the negative electrode collector tab is connected to a straight portion of the innermost periphery of the negative electrode plate and thus the arrangement of the spacer in the vicinity of the corner portion has only a small effect on the initial thickness of the battery.

(Study of Thickness of Spacer)

Table 2 lists the initial thickness and the rates of increase in the thickness of the batteries of Examples 4 and 5, each of the batteries including the insulating tape serving as a spacer with a large thickness, together with those of Example 1 and Comparative example 1.

TABLE 2

| | Insulating tape | | Charge voltage (V) | Initial thickness of battery (mm) | Rate of increase in thickness of battery (%) |
|---|---|---|---|---|---|
| | Base | Thickness | | | |
| Example 1 | PP | 50 µm | 4.2 | 4.353 | 3.6 |
| Example 4 | PP | 100 µm | 4.2 | 4.359 | 3.5 |
| Example 5 | PP | 150 µm | 4.2 | 4.431 | 3.7 |
| Comparative example 1 | no | | 4.2 | 4.358 | 9.6 |

Table 2 indicates that when the insulating tape serving as a spacer has a thickness of 100 µm or less, the initial thickness is equivalent to that of Comparative example 1 in which no spacer is used. In the case where the insulating tape is bonded to the corner portion of the first electrode plate, at least portions of the insulating tape overlap each other with the separator provided therebetween in the thickness direction of the electrode assembly. Thus, in the case where the thickness of the insulating tape is ½ or less of the thickness of the collector connected to the innermost peripheral portion of the first electrode plate, the insulating tape little affects the initial thickness of the battery.

In contrast, in Example 5 in which the insulating tape has a thickness of 150 μm, the initial thickness of the battery is slightly larger than that of Comparative example 1. The rate of increase in the thickness of the battery of Example 5, however, is substantially equal to those of Examples 1 and 4, and is significantly lower than that of Comparative example 1. Thus, in the present invention, the thickness of the insulating tape is preferably ½ or less of the thickness of the collector tab connected to the innermost periphery of the first electrode plate. However, even if the insulating tape having a thickness of ½ or more of the thickness of the collector tab, the effects of the present invention are sufficiently provided.

(Study of Charge Voltage)

To examine the effects of the present invention when charge is performed to a voltage higher than 4.2 V, each of the batteries of Example 1 and Comparative example 1 was tested under the following conditions: the charge voltage in the initial charge and discharge and the charge-discharge cycling was changed from 4.2 V to 4.35 V. Specifically, charge in the initial charge and discharge and the charge-discharge cycling was performed at a constant current of 0.5 It (=1800 mA) until the voltage reached 4.35 V. Subsequently, charge was performed at a constant voltage of 4.35 V until the current reached ¹⁄₂₀ It (=180 mA). Discharge conditions and a method for calculating the rate of increase in the thickness of the battery are the same as those in the test at a charge voltage of 4.2 V, excluding the charge conditions. Table 3 lists the initial thickness and the rates of increase in the thickness of the batteries of Example 1 and Comparative example 1.

TABLE 3

|  | Charge voltage | Initial thickness of battery (mm) | Rate of increase in thickness of battery (%) |
| --- | --- | --- | --- |
| Example 1 | 4.2 | 4.353 | 3.6 |
|  | 4.35 | 4.352 | 4.2 |
| Comparative example 1 | 4.2 | 4.358 | 9.6 |
|  | 4.35 | 4.355 | 11.3 |

Table 3 indicates that although a higher charge voltage results in a higher rate of increase in the thickness of the battery in Example 1, a higher charge voltage results in a greater effect of reducing the rate of increase, compared with Comparative example 1. That is, the present invention provides a more pronounced effect when combined with a technique for increasing the capacity of a battery by increasing the upper limit of the charge voltage. An excessively high charge voltage results in the degradation of the cycle characteristics; hence, the charge voltage is preferably 4.2 V or higher and 4.6 V or lower and more preferably 4.35 V or higher and 4.6 V or lower.

(Study of Negative Electrode Active Material)

Table 4 lists the initial thickness and the rates of increase in the thickness of the batteries of Example 6 and Comparative example 2 in which the mixture of SiO and graphite was used as a negative electrode active material in order to examine the effect of the present invention when SiO, which swells significantly during charge as compared with graphite, was used as a negative electrode active material. All the experimental results listed in Table 4 were obtained at a charge voltage of 4.35 V.

TABLE 4

|  | Negative electrode active material | Charge voltage (V) | Initial thickness of battery (mm) | Rate of increase in thickness of battery (%) |
| --- | --- | --- | --- | --- |
| Example 1 | graphite | 4.35 | 4.352 | 4.2 |
| Example 6 | graphite + SiO | 4.35 | 4.354 | 4.4 |
| Comparative example 1 | graphite | 4.35 | 4.355 | 11.3 |
| Comparative example 2 | graphite + SiO | 4.35 | 4.357 | 14.7 |

Table 4 indicates that the rate of increase in the thickness of the battery of Example 6 is substantially equal to that of Example 1. In contrast, the rate of increase in the thickness of the battery of Comparative example 2 is 3% or more higher than that of Comparative example 1. That is, the present invention provides a more pronounced effect when combined with a technique in which a high-capacity negative electrode active material is used. Although silicon oxide represented by SiO was used in Example 6, silicon oxide represented by $SiO_x$ ($0.5 \leq x < 1.6$) may be used without limitation. The negative electrode active material preferably has a silicon oxide content of 1% by mass or more and 20% by mass or less from the viewpoint of achieving both good battery capacity and good cycle characteristics.

INDUSTRIAL APPLICABILITY

In the present invention, the swelling of a nonaqueous electrolyte secondary battery including a flat wound electrode assembly due to charge-discharge cycling is inhibited by a simple method. Furthermore, the present invention provides a pronounced effect when combined with an increase in the voltage of a nonaqueous electrolyte secondary battery and a high-capacity negative electrode active material and thus has great industrial applicability.

REFERENCE SIGNS LIST 11 positive electrode plate
12 positive electrode core member
13 positive electrode active material layer
14 negative electrode plate
15 negative electrode core member
16 negative electrode active material layer
17 positive electrode collector tab
18 negative electrode collector tab
19 separator
20 spacer

The invention claimed is:

1. A nonaqueous electrolyte secondary battery comprising a flat electrode assembly in which a first electrode plate and a second electrode plate having a different polarity from the first electrode plate are wound with a separator provided therebetween,
   wherein the first electrode plate is disposed on a more inner peripheral side of the electrode assembly than the second electrode plate,
   the first electrode plate includes a two-side-exposed core member portion where no active material layer is disposed on either side of a core member and a single-side-exposed core member portion where an active material layer is disposed on only an outer peripheral surface of a core member, the two-side-exposed core member portion and the single-side-exposed core member portion being provided in this order from a winding-start end portion of the first electrode plate, a collector tab is connected to the two-side-exposed core member portion, the single-side-exposed core member portion occupies at least one corner portion of two corner portions connecting two straight portions in an innermost periphery of the first electrode plate, and the active material layer disposed on the outer peripheral surface of the single-side-exposed core member portion in the at least one corner portion faces the active material layer disposed on an inner peripheral surface of the second electrode plate with the separator provided therebetween, and a spacer is disposed on at least part of an inner peripheral surface of the single-side-exposed core member portion in the at least one corner portion.

2. The nonaqueous electrolyte secondary battery according to claim 1, wherein the spacer is formed of an insulating tape.

3. The nonaqueous electrolyte secondary battery according to claim 2, wherein the insulating tape does not overlap the collector tab in the thickness direction of the electrode assembly.

4. The nonaqueous electrolyte secondary battery according to claim 2, wherein the insulating tape has a thickness of ½ or less of the thickness of the collector tab.

5. The nonaqueous electrolyte secondary battery according to claim 1, wherein one of the first electrode plate and the second electrode plate serves as a positive electrode comprising a positive electrode active material, the other serves as a negative electrode plate comprising a negative electrode active material, and the negative electrode active material comprises a mixture of a graphite and a silicon oxide represented by $SiO_x$.

6. The nonaqueous electrolyte secondary battery according to claim 1, wherein a collector tab is connected to a two-side-exposed core member portion provided at a winding-start-end portion of the second electrode plate.

7. The nonaqueous electrolyte secondary battery according to claim 1, wherein the first electrode plate serves as a negative electrode plate, and the second electrode plate serves as a positive electrode plate.

* * * * *